United States Patent [19]

Misevich et al.

[11] Patent Number: 4,935,294

[45] Date of Patent: Jun. 19, 1990

[54] COMPOSITE SHEET MATERIAL

[75] Inventors: Kenneth W. Misevich, Griswold, Conn.; Rob R. McGregor, Concord, Mass.

[73] Assignee: Colgate-Palmolive Company, Piscataway, N.J.

[21] Appl. No.: 273,369

[22] Filed: Nov. 17, 1988

[51] Int. Cl.$^5$ .............................................. B32B 9/00
[52] U.S. Cl. .......................................... 422/246; 36/44; 428/253; 428/283; 428/284; 428/297; 428/323; 428/325; 428/402; 428/406; 428/348
[58] Field of Search ................... 36/44; 428/283, 246, 428/253, 406, 325, 367, 348, 297, 284

[56] References Cited

U.S. PATENT DOCUMENTS

| | | | |
|---|---|---|---|
| 3,236,796 | 2/1966 | Moyer | 428/348 |
| 4,107,380 | 8/1978 | Wiesman | 428/348 |
| 4,286,013 | 8/1981 | Daroga et al. | 428/406 |
| 4,308,633 | 1/1982 | Van Huffel et al. | 428/348 |
| 4,524,529 | 6/1985 | Schaefer | 36/44 |

*Primary Examiner*—James J. Bell
*Attorney, Agent, or Firm*—Richard J. Ancel; Robert C. Sullivan; Murray M. Grill

[57] ABSTRACT

A composite sheet material which yields under non-uniform pressures caused by irregularities of contact between two relatively hard surfaces adapted to provide a more uniform pressure distribution comprising the combination of relatively small granules and relatively small stiff fibers in a matrix of waxy material adhered to a web of flexible material.

9 Claims, 2 Drawing Sheets

COMPOSITE SHEET MATERIAL

BACKGROUND OF THE INVENTION

The present invention relates to a sheet material for primary use as shoe insoles.

Before the present invention, shoe insoles of various materials were shown for placement against the lower surface of the feet. Such insoles gradually deform by simple loading and do not relieve the pressure points caused by the uneven contact between the foot and the insole. Eventually insoles do permanently deform due to the deterioration of the insole material over time in response to the continued loading of the material. A fitting pad is disclosed in U.S. Pat. No. 4,255,202.

SUMMARY OF THE INVENTION

A principal feature of the present invention is the provision of an improved sheet of material which deforms to a shape which smooths out pressure distribution between the foot and the insole in a relatively short time.

In one embodiment, the sheet material of the invention comprises, a laminate having a plurality of layers comprising a carrier fabric coated on both sides by a waxy material, relatively small granules in the waxy material, and relatively stiff small fibers in the waxy material.

In another embodiment, the sheet material comprises a batt of relatively stiff small fibers having disposed therein hollow glass or plastic microspheres and a matrix of waxy material being bonded to a covered sheet.

A feature of the present invention is that the sheet material may be shaped for use as the insole of a shoe.

A further feature of the present invention is that the fibers and granules may move upon the application of pressures, and yield to form a relatively permanent irregular layer to reduce the forces between the foot and the insole after a short period of time.

Still another feature o the invention is that the fibers and granules become fixed in relation to each other after application of pressure, and the sheet material has been shaped by use, and the fibers and granules retain their relationship and the sheet retains its shape until different forces are applied.

Thus, a feature of the present invention is that the material quickly conforms to reduce or eliminate the pressure points preceived in the contact of the foot and against the insole sheet material.

A feature of the present invention is that when used as an insole, the sheet material provides an "old usedshoe" feel after a relatively short period of time.

Further features will become more fully apparent in the following description of the embodiments of this invention and from the appended claims.

DESCRIPTION OF THE PREFERRED EMBODIMENTS

Figure 1:
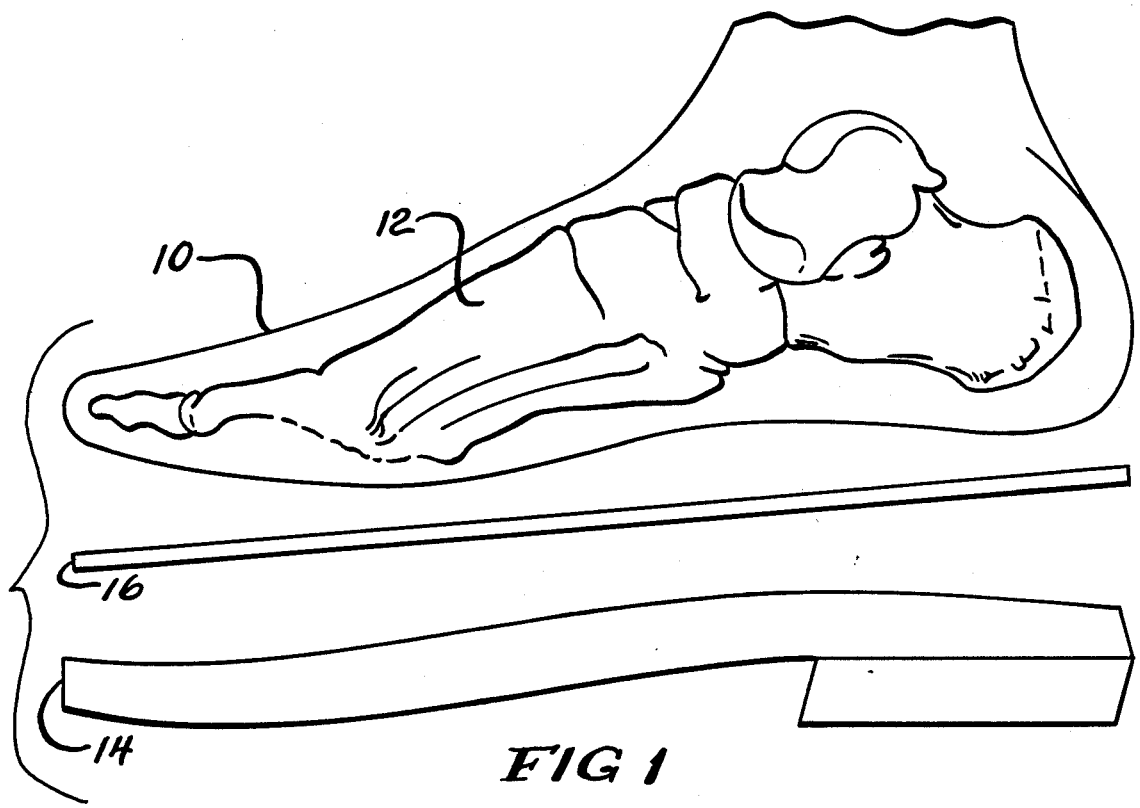
FIG. 1 is an elevational view showing the sheet material of the present invention interposed between a foot and the composite midsole/outsole of a shoe in an unloaded condition.
Figure 2:
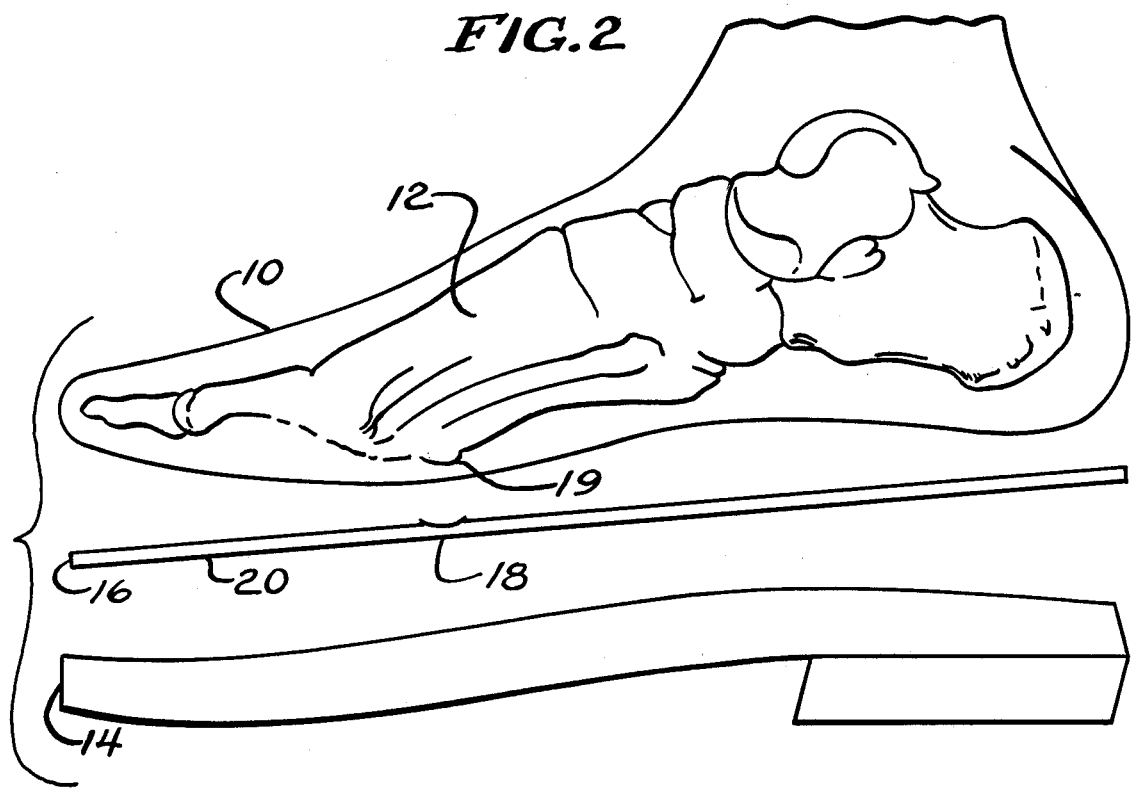
FIG. 2 is an elevational view of the sheet of the present invention in a loaded condition.

Referring now to FIGS. 1 and 2, there is shown a foot 10 having its skeletal bones 12 indicated and the support platform 14 which may comprise any known midsole/outsole combination. Interposed between the foot and the support platform is a sheet of material 16 which serves as an insole. As shown in FIG. 1, insole 16 is of essentially uniform thickness.

When the shoe is loaded by having foot 10 forced against insole 16 on support platform 14, as shown in FIG. 2, the insole 16 deforms and has areas of non-uniform thickness to account for an equalization of pressures from the foot as shown by deformed area 18 under the metatarsal arch 19 and the essentially non-deformed area under the fatty portion 20 of the foot.

Figure 3:
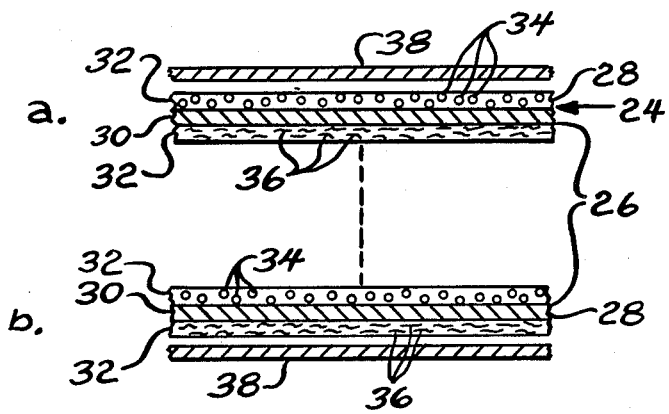
FIG. 3 is a sectional view of laminae for the laminate sheet material of one embodiment of the present invention.

Referring now to FIG. 3, there is shown the sheet material 24 of one embodiment of the present invention. The sheet material 24 comprises a laminate 26 of a plurality of individual layers or plies 28 which are placed against each other in the sheet material 24.

Each of the layers 28 comprises a central carrier fabric 30, such as a woven, knitted, nonwoven, or scrim material. In a suitable form, the carrier fabric 30 may comprise a nonwoven material sold under product No. LY143089 by the Kendall Company of Boston, Mass.

Both sides of the carrier fabric 30 are coated by a layer of waxy or adhesive material 32, such as a low molecular weight hydrocarbon or paraffin, which has a relatively low melting point, such as 200° F. The waxy material 32 is sprayed or laid in molten form onto opposed sides of the carrier fabric 30, and the carrier fabric 30 may be any suitable material which will hold the waxy material 32. The waxy material 32 holds the laminate 26 together during use.

As shown, a plurality of granules 34 are placed in the waxy material 32 in its molten condition. The granules 34 may comprise hollow glass microspheres, plastic microspheres, or bubbles preferably having a diameter of less than 100 microns. Although the granules 34 are shown on one side of the carrier fabric 30, it is understood that the granules 34 may be placed on both sides of the carrier fabric 30.

A plurality of chopped stiff fibers or flock 36 are also placed in the waxy material 32 in its molten condition. The fibers 36 may comprise a suitable fiber such as Dacron, a trademark of E.I. duPont de Nemours. Although the fibers 36 are shown as being placed on one side of the carrier fabric 30, it will be understood that the fibers 36 may be placed on both sides of the fabric 30 in the waxy material 32. Thus, both the granules 34 and fibers 36 are placed in the waxy material 32 while it is in a softened condition, after which the waxy material 32 is allowed to solidify.

The laminate 26 may comprise any suitable number of layers, such as about 10 plies which are placed against each other. The laminate 26 may have durable opposed outer covering layers 38, such as a suitable nonwoven material. The resultant sheet material may have a thickness of about ⅛inch.

During use, the sheet material 24 deforms responsive to the application of pressure in order to eliminate the pressure points between the foot 10 and the midsole/outsole formation 14 by the movement of the granules and flock within the insole 16 for the shoe. In this manner, the sheet material 24 provides a comfortable feel for the foot in a relatively short period of time. The granules 34 or micropheres provide lightness for the sheet material 24 and are permitted to move around in the waxy material 32 upon the application of pressure. The granules take up space in the waxy material 32, have a high strength, and do not break under the application of loads. Responsive to the application of pressure, the granules 34 become closely packed, and quickly provide an old shoe feel for the insole 16. Of course, during the application of pressure, the microspheres 34 flow or move in the waxy material 32.

Also, during use, the fibers or flock 36, which may be chopped, interlock, and when weight causes heat to build up in the waxy material 32 which melts somewhat and allows the fibers 36, as well as the granules 34, to move in the laminate 26. The fibers 36 provide strength to the 15, laminate 26, and the fibers migrate and interlock such that they mat up in the deformed sheet material 24.

In this manner, the sheet material 24 yields to pressure in a relatively short period of time, such as a few hours.. The sheet material 24 deforms to the pressure profile of the foot, and does not move back to the original shape in order to provide comfort and cushioning for the foot. The sheet will adjust, however, to different pressure profiles taken by the foot. Thus, the fillers comprising the granules 34 and fibers 36 interlock upon the application of pressure for a relatively short period of time, in order to provide conformability by the sheet material 24 to the pressure points.

Figure 4:
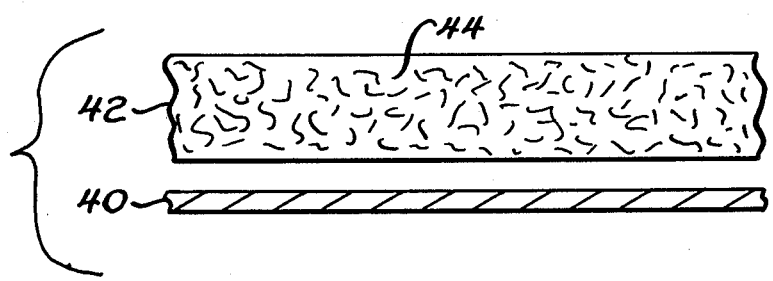
FIG. 4-6 are sectional views of the sheet material of another embodiment of the present invention showing its fabrication in a stepwise fashion.
Figure 5:
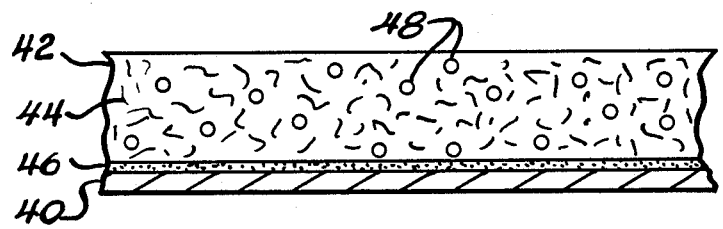
Figure 6:
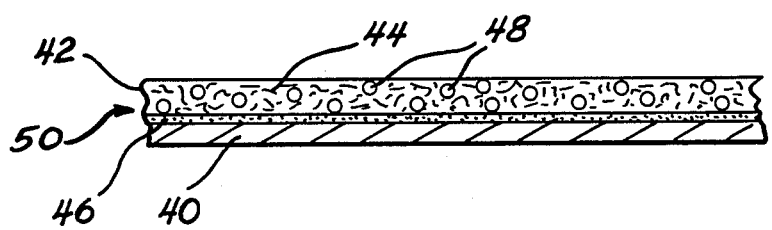

Turning now to FIG. 4–6, another embodiment of the invention is illustrated in the sequence in which the composite sheet is manufactured.

The composite sheet 50 (FIG. 6) comprises a single consolidated web having a bondable cover sheet 40 which is relatively impervious to the migration of the waxy or adhesive material to which is adhered a batt 42 of fibrous materials. As shown in FIG. 4, fibers 44 are loosely packed giving the batt a low bulk density.

FIG. 5 shows the batt 42 bonded to cover sheet 40 by means of adhesive layer 46 and having granules or microspheres 48 dispensed therein.

FIG. 6 shows the composite after hot wax has been sprayed on the batt 42, wicking through the fibers causing the fibers 44 and the granules or microspheres 48 to pack down to form a sheet of material suitable for use in shoe insoles.

The foregoing description is given for clearness of understanding only, and no unnecessary limitations should be understood therefrom, as modifications will be obvious to those skilled in the art.

We claim:

1. A sheet material which deforms to the shape of non-uniform pressure distribution, comprising:
a laminate having a plurality of layers comprising a carrier fabric and a layer of waxy material coated on opposite sides of the carrier fabric, said layer of waxy material having relatively small granules therein, and relatively small stiff fibers therein.

2. The material of claim 1 wherein the carrier fabric comprises a nonwoven material.

3. The material of claim 1 wherein the carrier fabric comprises a woven material.

4. The material of claim 1 wherein the carrier fabric comprises a knitted material.

5. The material of claim 1 wherein the granules comprise microspheres.

6. The material of claim 5 wherein the microspheres are hollow.

7. The material of claim 5 wherein the microspheres comprise glass.

8. The material of claim 5 wherein the microspheres comprise plastic.

9. The material of claim 5 wherein the microspheres having a diameter of less than 100 microns.

* * * * *